United States Patent [19]
Spitzer

[11] Patent Number: 5,217,197
[45] Date of Patent: Jun. 8, 1993

[54] VEHICLE REAR VIEW MIRROR EXTENSION DEVICE

[76] Inventor: Vernon J. Spitzer, HCR #1 Box 121, Baldwin, N. Dak. 58521

[21] Appl. No.: 682,333

[22] Filed: Apr. 9, 1991

[51] Int. Cl.⁵ ............................................. A47G 1/24
[52] U.S. Cl. .................................. 248/479; 248/485; 248/486; 248/487
[58] Field of Search .............. 248/479, 483, 480, 485, 248/486, 487, 475.1; 350/631

[56] References Cited

U.S. PATENT DOCUMENTS

| | | |
|---|---|---|
| 1,063,220 | 6/1913 | Seamon . |
| 4,123,030 | 10/1978 | Johansson . |
| 4,166,651 | 9/1979 | Vandenbrink . |
| 4,793,582 | 12/1988 | Bronstein . |
| 4,921,340 | 5/1990 | Dyer . |
| 4,938,578 | 7/1990 | Schmidt ............................. 248/479 |
| 5,028,029 | 7/1991 | Beck .................................. 248/479 |

*Primary Examiner*—David M. Purol

[57] ABSTRACT

An extension device to extend an original equipment vehicle side rear view mirror away from the vehicle so that the mirror may be used with wide loads. One end of a U-shaped extension device is inserted in the original mirror mounting bracket on the vehicle and the original mirror support arm is inserted in a sleeve that is rigidly secured to the other end of the extension device. Threaded fasteners, which are accessible to the driver through the vehicle window, extend through the sleeve to lock the mirror in adjusted position.

15 Claims, 1 Drawing Sheet

VEHICLE REAR VIEW MIRROR EXTENSION DEVICE

BACKGROUND OF THE INVENTION

This invention relates to an extension for a vehicle side rear view mirror for use when towing a wide load such as a trailer.

The prior art includes a number of examples of extension devices for vehicle side rear view mirrors needed when the vehicle such as a pickup is towing a wide load. Often such mirror extension devices include an entire assembly including mirror and mounting bracket which is attached to the vehicle only when needed. In another arrangement, the original equipment mirror is mounted on an extension device that is itself mounted in the original vehicle mirror mounting bracket. In Bronstein et al U. S. Pat. No. 4,793,582, one end of an inverted U-shaped extension member is mounted in the original vehicle mirror mount and the L-shaped support arm of the original mirror is mounted in a bracket that is removably clamped to the other end of the U-shaped extension member.

The Bronstein et al mirror extension device includes a number of features which are generally similar to the invention disclosed herein. An inverted generally U-shaped extension member is mounted in the original vehicle mirror mount. Also, the original equipment mirror is removably secured to the extension so that it may be remounted in its original placement. However, the arrangement of Bronstein et al presents problems inherent with the multiple piece design thereof, particularly in regard to adjusting the mirror to its proper position. It is difficult, for example, for one person to hold all of the pieces in proper position while the clamping elements are being tightened to secure the mirror in adjusted position. Further, as is well known, in order to determine the proper position of mirror adjustment the driver must be seated in normal driving position in the vehicle. Because of the multiple components that must be held in position until they are secured it is almost impossible for the driver of a vehicle to make an adjustment from inside the vehicle so that an assistant would likely be required for such procedure. Also, because of the clamp design, uneven clamping on the tubular members could result in the loss of the bracket or the mirror due to the normal road induced vibrations.

SUMMARY OF THE INVENTION

The inventor's one piece rugged design overcomes these and other problems while providing several other advantageous features. Basically, the invention involves a mirror support socket or sleeve that is rigidly welded to a U-shaped extension and the design is such that the mirror securing means can easily be manipulated by a seated person within the vehicle. The driver is thus able to adjust the position of the mirror through an open window while remaining seated in the vehicle and to tighten the securing setscrews without assistance. Further, even if one of the fasteners should vibrate loose the mirror and clamp cannot fall off the vehicle but would merely swing out of position.

DETAILED DESCRIPTION OF THE INVENTION

Figure 1:
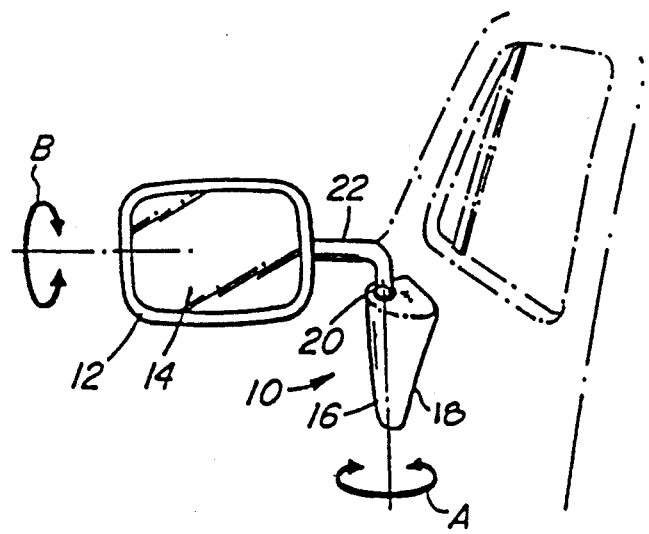
FIG. 1 illustrates a vehicle having a standard original equipment rear view mirror and mounting bracket.

In FIG. 1 one widely used original equipment rear view mirror assembly is shown mounted on a light duty vehicle such as a pickup truck. The assembly 10 includes a generally rectangular mirror housing 12 carrying a mirror 14. A standard mount 16 is secured to the vehicle door. The mount shown is somewhat rectangular in plan and in elevation and conforms on its inner surface 18 to the contour of the vehicle door. On the upper surface of the mount 16 an opening 20 leads to the interior of the mount wherein a variety of means are provided such as a clamp or sleeve and setscrew to fixedly secure and lock the support arm 22 for the mirror housing 12. The standard arm 22 is shown as being circular in cross-section and as being generally L-shaped in contour. The vertical leg of the arm 22 is secured to the mount 16 for rotation about a vertical axis (arrow A) and the housing 12 is secured to the horizontal leg of the arm 22 for rotation about a horizontal axis (arrow B) to achieve full adjustability to meet the needs of the driver.

Figure 2:
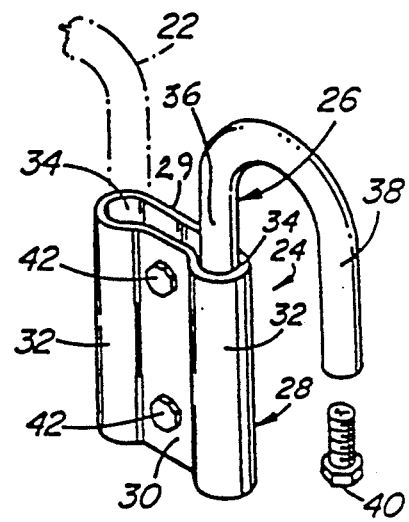
FIG. 2. illustrates in perspective a prior art extension device and clamp for a vehicle rear view mirror.
Figure 3:
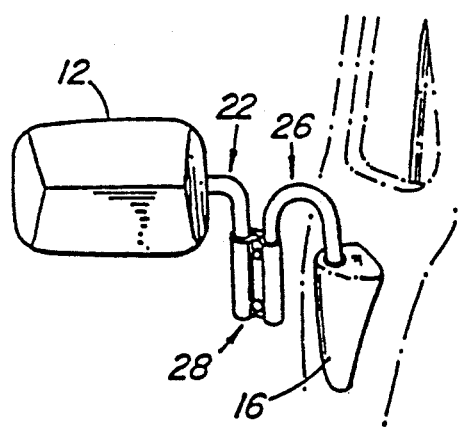
FIG. 3. is a perspective view illustrating the prior art mirror extension of FIG. 2 mounted on a vehicle.

FIG. 2 illustrates at 24 a prior art mirror extension device of which the present invention is an improvement. The device 24 utilizes an inverted generally U-shaped tubular extension member 26 and a removable clamp member 28. The clamp member 28 is stated as being desirably formed from a length of tubular material deformed to the shape shown in FIG. 2 so as to have a flat rear wall 29, a flat front wall 30, and a pair of curved side walls 32, with each side wall 32 defining a generally circular through-passage 34. One of the passages 34 is adapted to receive one leg 36 of the extension member 26 and the other passage 34 is adapted to receive the vertical leg of the mirror support arm 22. The remaining leg 38 of the extension member 26 is adapted to be received in the opening 20 of the vehicle mount 16. Depending on the type of mount provided on the vehicle it is stated that it may be necessary to effect connection of the leg 38 thereto by way of a bolt 40 which can be received in the threaded bore (not shown) in the end of the leg 38.

In FIG. 2, the clamp member 28 is illustrated and described as desirably formed as a single piece of metal. Bolts 42 are provided extending through the walls 30, 29 with nuts on the back side (not shown) so that when the bolts and nuts are tightened the side wall 32 will be tightly clamped about the legs of the support arm 22 and the extension member 26. To adjust the mirror the user would loosen the bolts 42 and rotate the respective arms to the desired position where they would be held while the bolts 42 were retightened. Such procedure obviously could not be done solely by a driver while seated in the vehicle.

Figure 4:
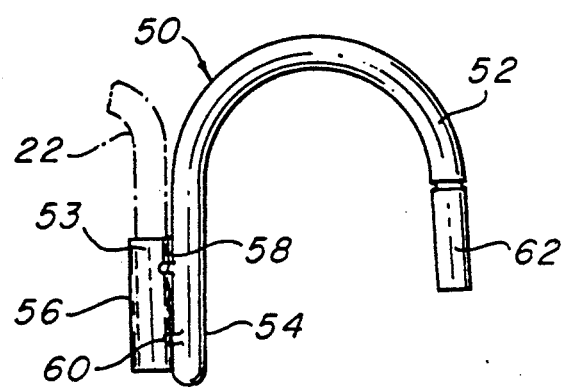
FIG. 4. is a front elevation view of the invention.

FIG. 4 illustrates the present invention generally at numeral 50. The invention 50 includes an inverted generally U-shaped rod 52 formed preferably from three-quarter inch diameter solid steel or aluminum rod. The ends of the U-shaped rod are spaced apart approximately seven inches. Along and generally parallel to the outer end 54 of the U-shaped rod is an approximately three inch sleeve 56 secured preferably by welds as at 58 along both sides of the sleeve. The sleeve 56 has a circular inner bore 53 the diameter of which corresponds with that of the L-shaped arm of the particular mirror with which it is intended to be used. A plurality of Allen setscrews 60 are mounted in threaded bores in the sleeve 56 in a position so that they are easily accessible to the driver while seated in the vehicle. The setscrews 60 may be tightened to secure and lock the arm 22 of the mirror in adjusted position. The inner end 62 of the U-shaped rod 52 is adapted to be mounted in the original equipment vehicle mounting bracket 16 and to be secured therein by the original equipment securing elements.

OPERATION

The invention is installed by loosening the fasteners securing the original equipment mirror 14 from mounting bracket 16 and removing it along with its attached L-shaped support arm 22. The inner end 62 of the U-shaped extension 52 is then inserted in the vehicle mounting bracket 16 and secured in position by the fastener means used to secure the original equipment mirror support arm. Mirror support arm 22 is then inserted into the bore 53 of the sleeve 56 and lightly secured by the set screws 60. The user then enters the vehicle and through the window makes any needed adjustments to properly position the mirror. While still seated in the vehicle the user can fully tighten the set screws 60 into the arm 22 fixedly securing the mirror in position. Readjustment of the mirror, as necessary, can also be accomplished by the driver of the vehicle without assistance through the vehicle window. Because the U-shaped extension is rigidly constructed as one piece and also is formed of solid metal the mirror is remarkably free from vibration during use.

Having described my invention I claim:

1. An extension device adapted to extend a vehicle original equipment mirror away from the side of the vehicle, and wherein the original mirror assembly includes a mounting bracket secured to the vehicle and a generally vertically extending cylindrical mirror support arm received within the mounting bracket, the extension device comprising: an inverted generally U-shaped extension arm having a cylindrical first end portion of a diameter to fit within the original equipment mirror mounting bracket, said extension device including a second end portion having a sleeve member integrally rigidly secured therewith, said sleeve including an internal bore of a diameter substantially corresponding to the diameter of the mounting arm of the original equipment mirror with which it is intended to be used, and threaded fastener means in said sleeve adapted to clamp the mirror support arm in fixed position.

2. The subject matter of claim 1, wherein the U-shaped extension comprises a solid steel member.

3. The subject matter of claim 1, wherein the U-shaped extension comprises a solid aluminum member.

4. The subject matter of claim 1, wherein the U-shaped member is circular in cross-section throughout its length.

5. The subject matter of claim 4, wherein the sleeve is generally circular in cross-section.

6. The subject matter of claim 1, wherein the sleeve is welded to the U-shaped member.

7. The subject matter of claim 1, wherein threaded fasteners extend through openings in the sleeve.

8. An extension device adapted to extend a vehicle original equipment mirror away from the side of the vehicle, and wherein the original mirror assembly includes a mounting bracket secured to the vehicle and a generally vertically extending cylindrical mirror support arm received within the mounting bracket, the extension device comprising: an inverted generally U-shaped extension arm of solid metal having a cylindrical first end portion of a diameter to fit within the original equipment mirror mounting bracket, said extension device including a second end portion having a sleeve member welded thereto along the length thereof, said sleeve including an internal bore of a diameter substantially corresponding to the diameter of the mounting arm of the original equipment mirror with which it is intended to be used, and threaded fastener means extending through openings in said sleeve located adjacent said weld, said threaded fastener means being adapted to secure the mirror support arm in a fixed position.

9. An extension device adapted to extend a vehicle original equipment mirror away from the side of the vehicle, and wherein the original mirror assembly includes a mounting bracket secured to the vehicle and a generally vertically extending cylindrical mirror support arm received within the mounting bracket, the extension device comprising: an extension arm of solid metal having a cylindrical first end portion of a diameter to fit within the original equipment mirror mounting bracket, said extension device including a second end portion having a sleeve member welded thereto, said sleeve including an internal bore of a diameter substantially corresponding to the diameter of the mounting arm of the original equipment mirror with which it is intended to be used, and threaded fastener means extending through openings in said sleeve, said threaded fastener means being adapted to secure the mirror support arm in a fixed position.

10. The subject matter of claim 9, wherein the extension device comprises a U-shaped steel member.

11. The subject matter of claim 9, wherein the extension device comprises a U-shaped solid aluminum member.

12. The subject matter of claim 9, wherein the extension member is circular in cross-section throughout its length.

13. The subject matter of claim 9, wherein the sleeve is generally circular in cross-section.

14. The subject matter of claim 9, wherein the sleeve is welded to the U-shaped member.

15. The subject matter of claim 9, wherein the threaded fastening means are positioned so as to be accessible to the seated driver of a vehicle through the window.

* * * * *